US009848029B2

(12) United States Patent
Vezzuto et al.

(10) Patent No.: US 9,848,029 B2
(45) Date of Patent: Dec. 19, 2017

(54) HIGHLY-SCALABLE DATA TRANSMISSION

(71) Applicant: OpenTV, Inc., San Francisco, CA (US)

(72) Inventors: Enrico Vezzuto, San Jose, CA (US); Philippe Stransky-Heilkron, Cheseaux-sur-Lausanne (CH)

(73) Assignee: OPENTV, INC., San Francisco, CA (US)

( * ) Notice: Subject to any disclaimer, the term of this patent is extended or adjusted under 35 U.S.C. 154(b) by 198 days.

(21) Appl. No.: 13/730,117

(22) Filed: Dec. 28, 2012

(65) Prior Publication Data
US 2014/0189046 A1  Jul. 3, 2014

(51) Int. Cl.
H04L 29/08 (2006.01)
H04L 12/18 (2006.01)
H04L 29/06 (2006.01)

(52) U.S. Cl.
CPC ............ *H04L 67/02* (2013.01); *H04L 12/185* (2013.01); *H04L 67/108* (2013.01); *H04L 12/18* (2013.01); *H04L 29/06* (2013.01)

(58) Field of Classification Search
CPC combination set(s) only.
See application file for complete search history.

(56) References Cited

U.S. PATENT DOCUMENTS

| 6,427,238 B1 | 7/2002 | Goodman et al. | |
| 8,191,102 B2 | 5/2012 | Newton et al. | |
| 2001/0034788 A1* | 10/2001 | McTernan | G06F 17/30905 709/232 |
| 2005/0259682 A1* | 11/2005 | Yosef et al. | 370/468 |
| 2008/0114859 A1* | 5/2008 | Orzen | H04H 20/24 709/218 |
| 2008/0243924 A1* | 10/2008 | Barrett et al. | 707/104.1 |
| 2013/0275840 A1* | 10/2013 | Gilson | G06F 11/10 714/784 |

FOREIGN PATENT DOCUMENTS

GB           EP2458780 A1 *  5/2012  ............. H04L 12/18

OTHER PUBLICATIONS

Postel, Jon. "User Datagram Protocol." Isi (1980).*
Jacobson, Van, et al. "RTP: A transport protocol for real-time applications." (2003).*
Postel, Jon. "RFC 791: Internet Protocol." (1981).*

* cited by examiner

Primary Examiner — Chris Parry
Assistant Examiner — Caroline Jahnige
(74) Attorney, Agent, or Firm — Schwegman Lundberg & Woessner, P.A.

(57) ABSTRACT

Methods and systems for transmitting and receiving data, such as, for example, entertainment data, are presented. In one example, a data file is segmented into a plurality of data modules. A header is generated for each of the data modules, with the header including a module identifier for the data module associated with the header. An indication of a number of the plurality of data modules associated with the data file, and at least one multicast address from which the plurality of modules may be received via a multicast transmission, are generated and transmitted. The data modules with their associated headers are transmitted over a communication network in the multicast transmission.

25 Claims, 13 Drawing Sheets

HIGHLY-SCALABLE DATA TRANSMISSION

FIELD

This application relates generally to the field of electronic communications and, in an example embodiment, to highly-scalable data transmission.

BACKGROUND

Data file retrieval over a communication network, such as over a wide-area network (WAN) (e.g., the Internet), is typically accomplished via a point-to-point data transfer from a source device or system of the data (e.g., a server) to a destination device of system for the data (e.g., a client). Typically, to initiate such a data transmission, a destination device requests the data from the source device, causing the source device to create an internal execution process to manage the transmission, with that process consuming some amount of memory and processing resources in the source device. As a result, if a high number of requests for the data file are received at the source device from multiple destination devices within a short period of time, many processes may be active simultaneously or concurrently in the source device, possibly causing a depletion of memory and processor resources therein. Further, processing of additional requests may be delayed until at least some of the requested data transmissions currently being processed have been completed due to limits in the amount of memory and processor resources available at the source device. Accordingly, the response time of at least some requests for the data file is likely to be impacted negatively.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1:
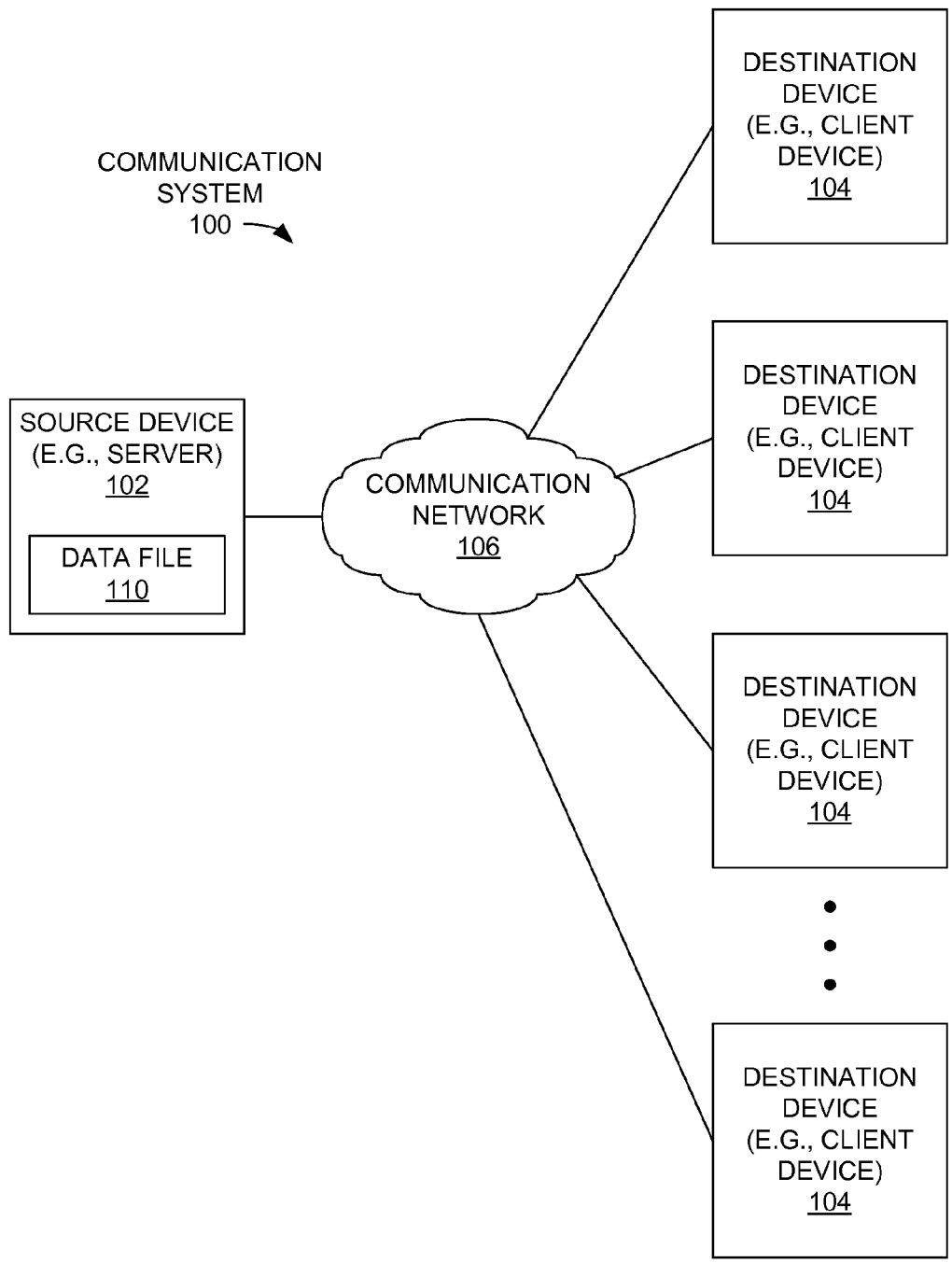
FIG. 1 is a block diagram of an example communication system for transmitting data from a source device to multiple destination devices.

FIG. 1 is a block diagram of an example communication system 100 for transmitting data (e.g., a data file 110), from a source device 102 (e.g., one or more servers or media content head-end systems) to destination devices 104 (e.g., client devices) via a communication network 106 (e.g., a WAN (such as the Internet, an Intranet, or a wireless cellular network), a local-area network (LAN) (such as a WiFi® network or Ethernet network), a digital broadcast network (e.g., satellite television, cable television, and digital terrestrial television (DTT)), and/or any other communication network). As is described in greater detail below, one or more of the destination devices 104 may be coupled with the source device 102 via both a broadcast/multicast network and a bidirectional (e.g., broadband) network, both of which may carry the data file 110 and associated information to the destination devices 104. Further, depending on the response time of the multiple networks, a destination device 104 may select a particular communication network 106 over another by which to receive portions of the data file 110.

In some examples, the data file 110 is data that may be repeatedly requested for transmission by a multitude of destination devices 104, such as a video-on-demand (VOD) catalogue of video programs; data for an electronic program guide (EPG) for cable, satellite, or terrestrial television broadcasts; interactive applications; executable applications, entertainment-related data; and the like. Of course, the data file 110 may include any other type of data that may be requested by many destination devices 104 within a short period of time. Also, while one data file 110 is depicted, the communication system 100 may transmit more than one data file 110 concurrently via the communication network 106 to varying groups of the destination devices 104.

In some embodiments, the source device 102 segments the data file into multiple data modules and cyclically transmits the data modules via a multicast connection to those client devices 104 that have joined the multicast transmission. The data modules may be augmented with error detection and/or correction data to facilitate detection and/or correction of data errors at the destination devices 104. In addition, by cyclically transmitting the data modules, the source device 102 provides the destination devices 104 the ability to receive a subsequent copy of a data module if a previous copy was uncorrectable and to receive the data modules out of sequence while retaining the ability to reconstruct the entirety of the data file 110. In other examples described below, the data modules may be provided over a broadcast and/or point-to-point communication connection in addition to the multicast connection. Other possible advantages will become apparent in light of the various embodiments discussed below.

Figure 2:
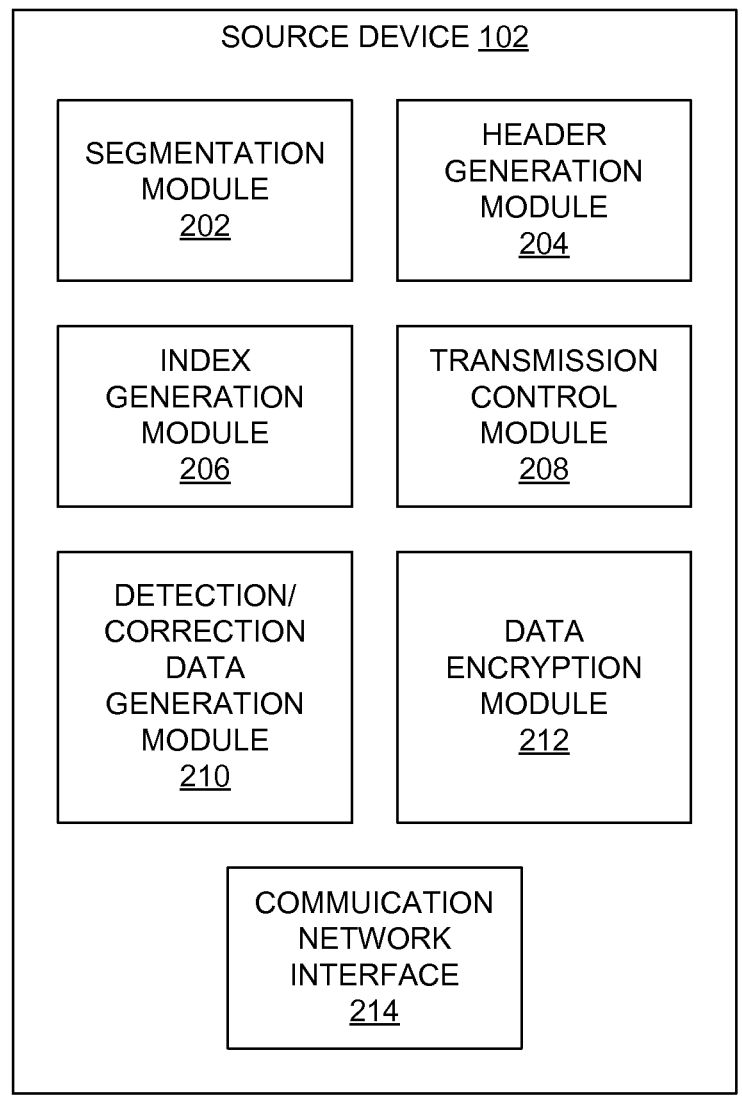
FIG. 2 is a block diagram of an example source device for transmitting data to multiple destination devices.

FIG. 2 is a block diagram of an example source device 102 for transmitting one or more data files 110 to multiple destination devices 104. In this example, the source device 102 may include a segmentation module 202, a header generation module 204, an index generation module 206, a transmission control module 208, a detection/correction data generation module 210, a data encryption module 212, and a communication network interface 214. Other components, such as one or more processors, one or more memory devices, and the like, are not explicitly depicted in FIG. 2 or FIG. 3 to simplify and focus the following discussion. Also, one or more of the modules described herein may be hardware modules, software modules stored in memory and executed by one or more processors, or some combination thereof. Further, one or more of the modules depicted in the source device 102 of FIG. 2, as well as the destination device of FIG. 3, may be omitted in some embodiments. In some examples, the source device 102 may be a network server or a collection of servers, or a head-end system for a cable or satellite video communication system.

The segmentation module 202 may segment or divide the data file 110 into multiple data modules or packets for transmission over the communication network 106. The size of the data modules may be fixed across the data file 110, may be variable across the data file 110 based on the type of data provided in the data file 110, or may vary from one data file 110 to another.

The header generation module 204 may generate a header for each of the data modules provided by the segmentation module 202. In some examples, the headers may provide information employed by the receiving destination devices 104 to receive the data modules and store or arrange the data modules to reconstitute the data file 110. Examples types of information provided in the headers are discussed in greater detail below.

The index generation module 206 may generate an index file that provides information of interest to the destination devices 104 regarding the data file 110, possibly in addition to other data files 110 available at the source device 102. A possible index file is presented and discussed in greater detail hereinafter. In some examples, the index generation module 206 may generate and present this information in another data format or structure instead of an index file for use by the destination devices 104, such as, for example, within one or more data module headers.

The detection/correction data generation module 210, if included in the source device 102, may generate error detection and/or correction data to be added to each of the data modules prior to transmission over the communication network 106 to allow a receiving destination device 104 to detect and/or correct data errors exhibited in the corresponding data module. This additional data may be added to the data module, the header associated with the data module, or some combination thereof. Example error detection data may include parity data, cyclic redundancy check (CRC) data, and so on. Example error correction data may include error correction code (ECC) data in any of its various forms, or data generated according to any other type of error correction scheme. Also, the generated data may aid in the detection and/or correction of data errors in either or both the data module and its corresponding header in some examples.

The data encryption module 212, if included in the source device 102, may encrypt either or both of a data module or its associated header prior to transmitting the data module. The type of data encryption employed may be, for example, private-key encryption or public-key encryption.

The transmission control module 208 may control the format, timing, and order of the transmission of the data modules and their associated headers, possibly along with the index file, in a cyclical manner by way of a multicast transmission. Of course, cyclic transmission is just one option, and multiple varieties of redundant transmission of the data modules could be selected, such as, for example, repeating the transmission of only selected modules, or repeating the transmission of the data modules in a variety of patterns. In one example, one or more of the data modules associated with one or more data files 110 may be transmitted more often than other data modules (e.g., by reducing a cycle time or increasing a transmission speed of the data modules of interest) based on an increased popularity of the data modules, which may, for example, depend on the number of destination devices 104 attempting to retrieve those data modules.

In one example, the multicast transmission may adhere to the Internet Group Management Protocol (IGMP), although other multicast transmission protocols may be utilized in other implementations. In addition, each of the data modules may be transmitted via one or more Transmission Control Protocol (TCP) packets, User Datagram Protocol (UDP) datagrams, Motion Picture Experts Group (MPEG)-2 packets, or the like.

The communication network interface 214 may format and transmit the data (e.g., the data modules, their respective headers, and the index file for each data file 110) for transport over the communication network 106. In one example, the data may be formatted according to the User Datagram Protocol (UDP). In other implementation, the data may be formatted according to a Real-time Transport Protocol (RTP) over UDP. However, many other transport protocols may be employed in lieu of the specific data transport protocols noted herein. The communication network interface 214 may also receive data via the communication network 106.

Figure 3:
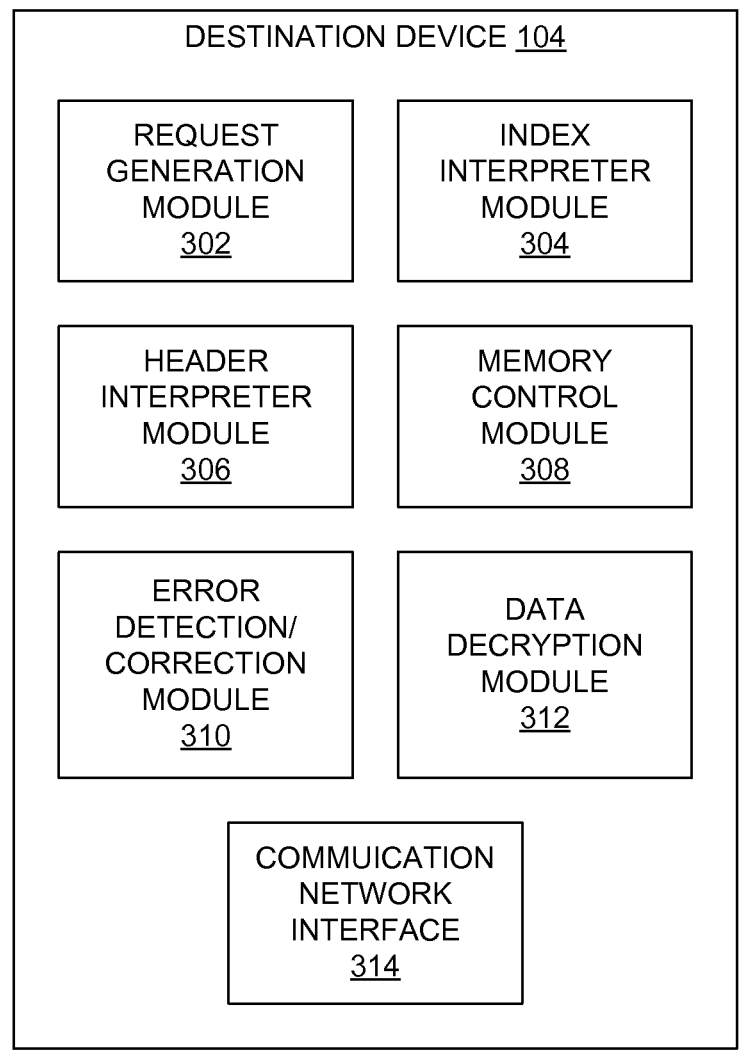
FIG. 3 is a block diagram of an example destination device for receiving data transmitted from a source device.

FIG. 3 is a block diagram of an example destination device 104 for receiving data transmitted from a source device 102. As shown, the destination device 104 may include a request generation module 302, an index interpreter module 304, a header interpreter module 306, a memory control module 308, an error detection/correction module 310, a data decryption module 312, and a communication network interface 314. In various examples, the destination device 104 may be a satellite or cable set-top box, a television, a desktop computer, a laptop computer, a tablet computer, a smart phone, a personal digital assistant (PDA), a gaming system, or any other type of client or communication device capable of receiving data over a communication network.

The request generation module 302 may generate requests for one or more data files 110 to be transmitted to the destination device 104 via the communication network interface 314. In some examples, the requests may be in the form of join messages requesting that data modules associated with a specific multicast transmission be delivered to the destination device 104, or in the form of request messages for retrieving one or more data modules via a point-to-point transmission.

The index interpreter module 304 may retrieve an index file, as described above, via a multicast transmission, a point-to-point transmission, a broadcast transmission (e.g., via satellite television, cable television, or DTT), or other means via the communication network interface 314, and then interpret or parse the index file to retrieve information regarding one or more data files 110 for possible reception at the destination device 104. An example index file is described in greater detail below. In other examples, the index interpreter module 304 may retrieve this information from other data structures instead of an index file.

Based on the contents of the index file, as interpreted by the index interpreter module 304, the destination device 104 may join a multicast transmission of data modules of a data file 110 of interest via a join message transmitted via the request generation module 302 and the communication network interface 314. In other examples, the data modules may be received via digital broadcast transmission, such as via satellite, cable, or terrestrial television. For each data module being received, the header interpreter module 306 interprets or parses the associated header of the received data module. In one example, the header identifies the particular data module of the data file 110 so that it may be combined correctly with other data modules to reconstitute the data file 110. The header interpreter module 306 may pass such information to the memory control module 308, which may employ the information to store the module in a specific location in memory (not explicitly shown in FIG. 3) relative to other data modules that have already been received, or that may be received in the near future from the multicast transmission.

Either before or after storage of the received data module, the data detection/correction module 310 and/or the data decryption module 312, if included in the destination device 104, may perform error detection/correction and/or data decryption on the received data module as appropriate based on whether the source device 102 added error detection/correction data and/or encrypted the data module prior to transmission.

The communication network interface 314 may receive data (e.g., the data modules, their respective headers, and the index file for each data file 110), as well as transmit data, via the communication network 106. As with the communication network interface 214 of the source device 102, the data modules may be formatted according to UDP, RTP over UDP, or some other transmission protocol in some examples.

Figure 4:
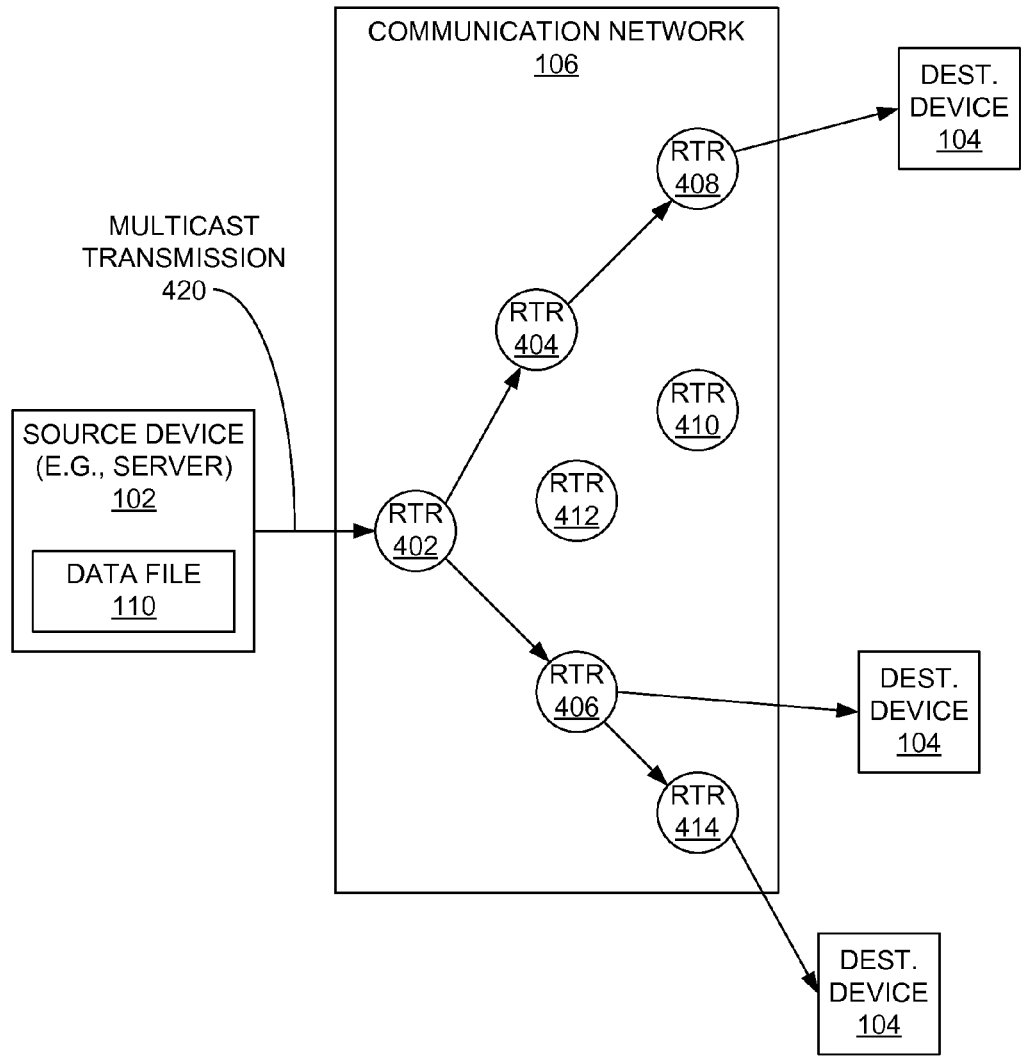
FIG. 4 is a block diagram of an example multicast transmission of data from a source device to multiple destination devices.

FIG. 4 is a block diagram of an example multicast transmission 420 of data from the source device 102 over the communication network 106 to multiple destination devices 104. As depicted, the source device 102 may initiate the multicast transmission 420 via a single router 402 in the communication network 106, which may, in turn, route the multicast transmission via one or more additional routers (e.g., routers 404, 406, 408, and 414) to one or more destination devices 104. In one example, to maintain the amount of communication bandwidth consumed in the communication network 106 by the multicast transmission 420, the transmission may not begin from the source device 102 until at least one destination device 104 joins the multicast transmission 420. Additionally, only the routers 402, 404, 406, 408, and 414 that are needed to deliver the multicast transmission 420 to the destination device 104 that have joined the multicast transmission 420 may receive the associated data modules, while other routers (e.g., routers 410 and 412) remain uninvolved with the multicast transmission 420. Subsequently, routers 410 and 412 may become involved in distributing the data modules if other destination devices 104 join the multicast transmission 420, while one or more of the involved routers 404, 406, 408, and 414 may disengage from the multicast transmission 420 all destination devices 104 they are serving drop the multicast transmission 420.

Figure 5:
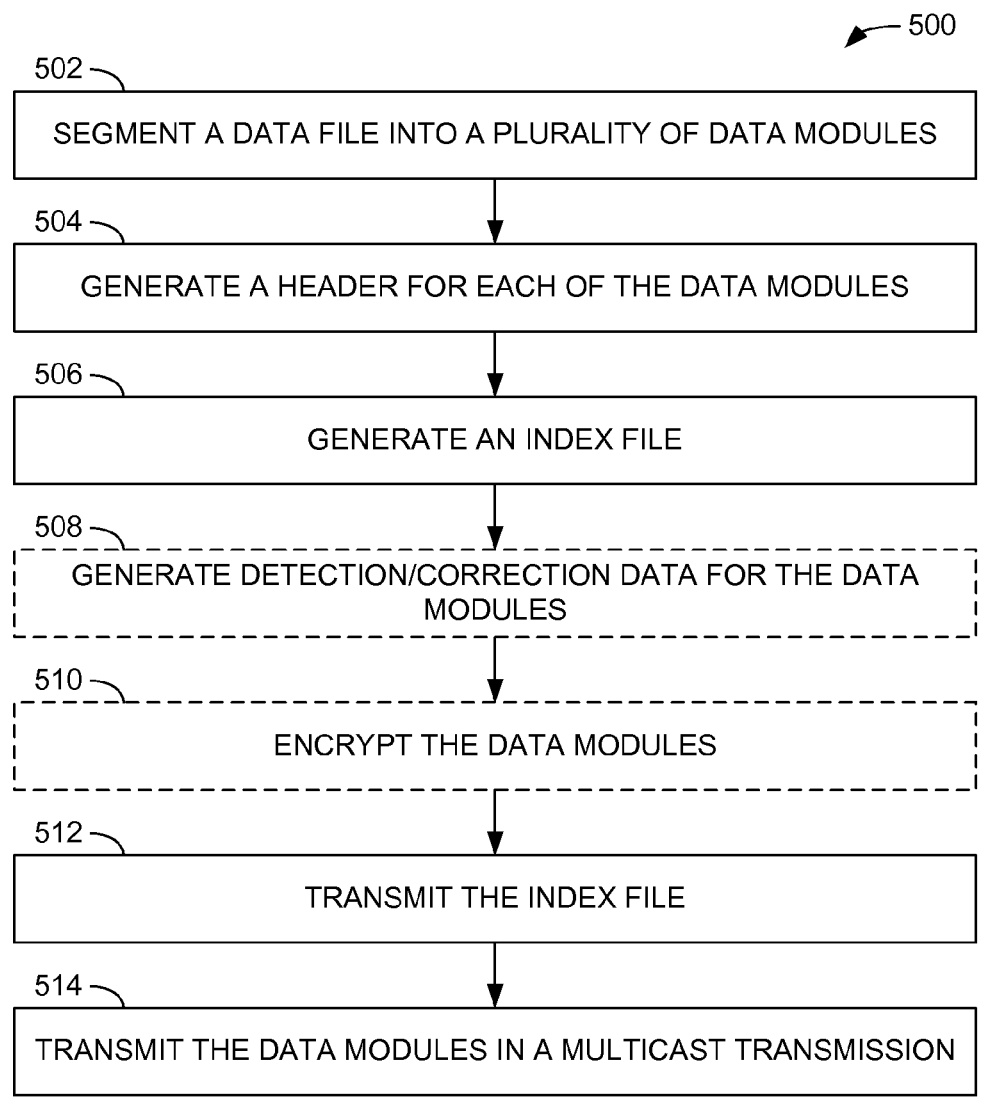
FIG. 5 is a flow diagram of an example method of transmitting data from a source device.

FIG. 5 is a flow diagram of an example method 500 of transmitting data from a source device. In the following description, the source device 102 of FIGS. 1 and 2 is described as performing the operations of the method 500. However, in other implementations, another source device or system not specifically described herein may perform these operations. In the method 500, the segmentation module 202 of the source device 102 storing or having access to a data file 110 segments the data file 110 into a plurality of data modules (operation 502). Depending on the implementation, the resulting data modules may be approximately the same size, or may vary in size significantly. The header generation module 204 may then generate a header for each of the data modules (operation 504), with each header providing information that may aid a destination device 104 in receiving and assembling the data modules to reconstitute the data file 110. Also, the index generation module 206 of the source device 102 may generate an index file (operation 506), with the index file possibly containing information descriptive of the data file 110, the various data modules resulting therefrom, and the multicast transmission carrying the data modules, thus aiding the destination devices 104 further in receiving the appropriate data modules of the data file 110 of interest. In some examples, this information may be provided in the data module or other data structures aside from a dedicated index file.

If the data modules are to carry redundancy data, such as error detection and/or correction data to facilitate those operations at the destination devices 104, the detection/correction data generation module 210 may generate such data (operation 508) and incorporate that data in the data modules or their associated headers, or append such data to the data module. Similarly, if the data modules are to be encrypted to prevent access to the data modules by unauthorized destination devices 104, the data encryption module 212 may encrypt each data module (operation 510), possibly along with each corresponding header, prior to transmission.

The transmission control module 208 of the source device 102 may then transmit the generated index file (operation 512) via the communication network interface 214, possibly by way of a multicast transmission 420, a point-to-point transmission, or a broadcast transmission. In other examples, the index file may be transmitted over a separate communication network interface. The transmission control module 208 may also transmit each of the data modules and accompanying headers using the multicast transmission 420 (operation 514). In various examples, the data modules and headers may be transmitted in a cyclical or other redundant or repetitive manner, whether predetermined or selectable.

While the operations 502 through 514 of FIG. 5 (as well as the operations of other methods illustrated herein) are shown as occurring in a specific order, other orders of operation, including concurrent execution of two or more operations, are also possible. For example, the generation of the headers and the index file may occur concurrently. Also, the source device 102 may concurrently process multiple separate data files 110 that may be made available to one or more destination devices 104.

Figure 6:
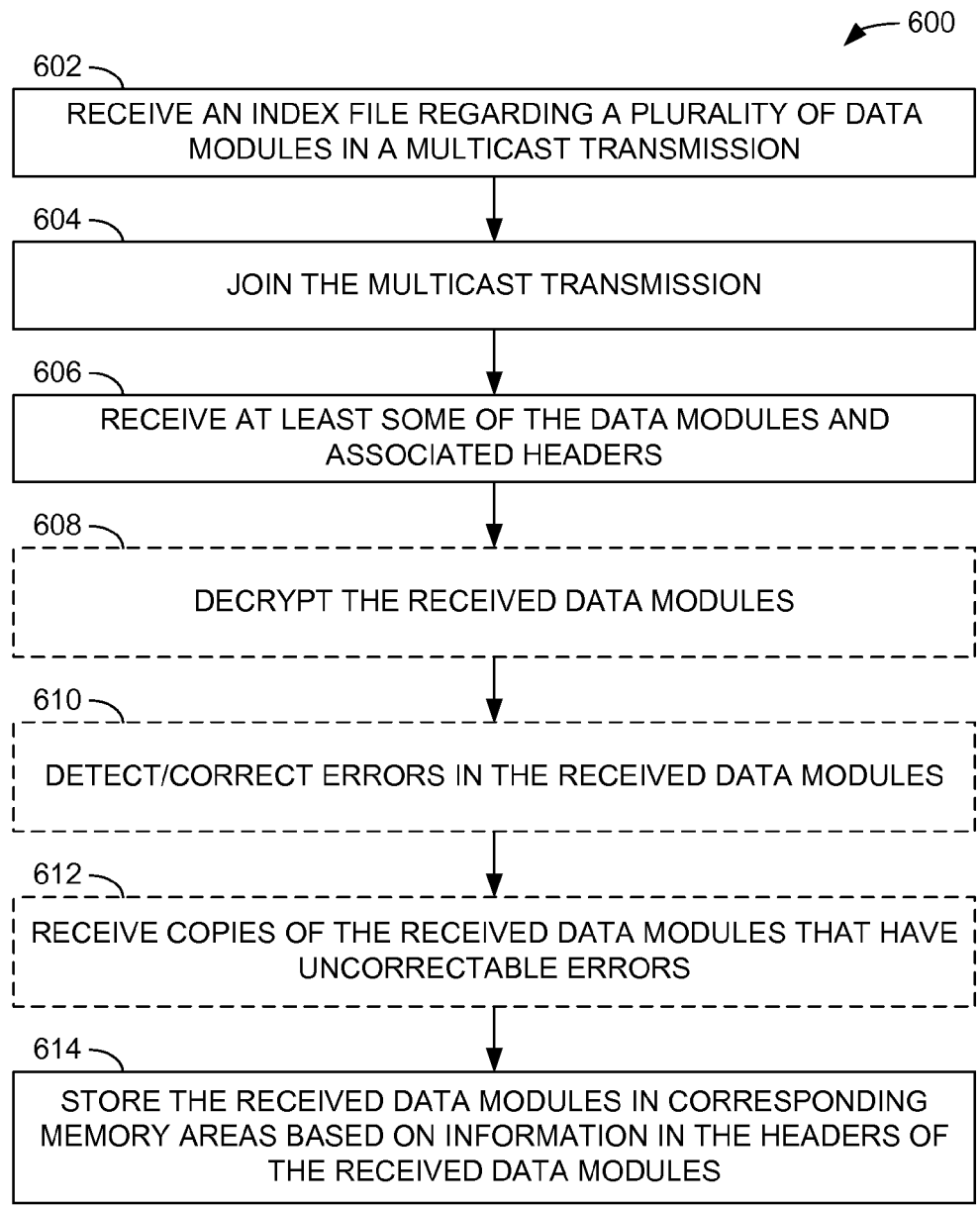
FIG. 6 is a flow diagram of an example method of receiving data at a destination device.

FIG. 6 is a flow diagram of an example method 600 of receiving data at a destination device 104. The following description presumes that the destination device 104 of FIGS. 1 and 3 performs the operations, but other devices or systems may perform the various operations in other embodiments. In the method 600, the index interpreter module 304 of the destination device 104 may receive an index file via the communication network interface 314 (operation 602), with the index file providing information regarding data modules of the data file 110 that are accessible via a multicast transmission. In one example, the retrieval of the index file may be initiated by the request generation module 302. Based on the information in the retrieved index file, the request generation module 302 may issue a message via the communication network interface 314 to join the multicast transmission 420 (operation 604).

After joining the transmission, the communication network interface 314 of the destination device 104 may receive one or more of the data modules and associated headers from the multicast transmission 420 (operation 606). If the received data modules are encrypted, the data decryption module 312 of the destination device 104 may decrypt the data modules (operation 608). Further, if a received data module carries error detection/correction data, the error detection/correction module 310 of the destination device 104 may process the data module to determine if any errors are detected and correct those detected errors, if possible (operation 610). If the data module includes any uncorrectable data, the communication interface module 314 may retrieve a subsequent copy of the data module from the multicast transmission 420 (operation 612). Any error-free or fully-corrected data modules received via the communication network interface 314 may then be provided to the memory control module 308 to be stored in a particular memory area corresponding to the specific data module being stored based on the information provided in the data module header (operation 614).

Figure 7:
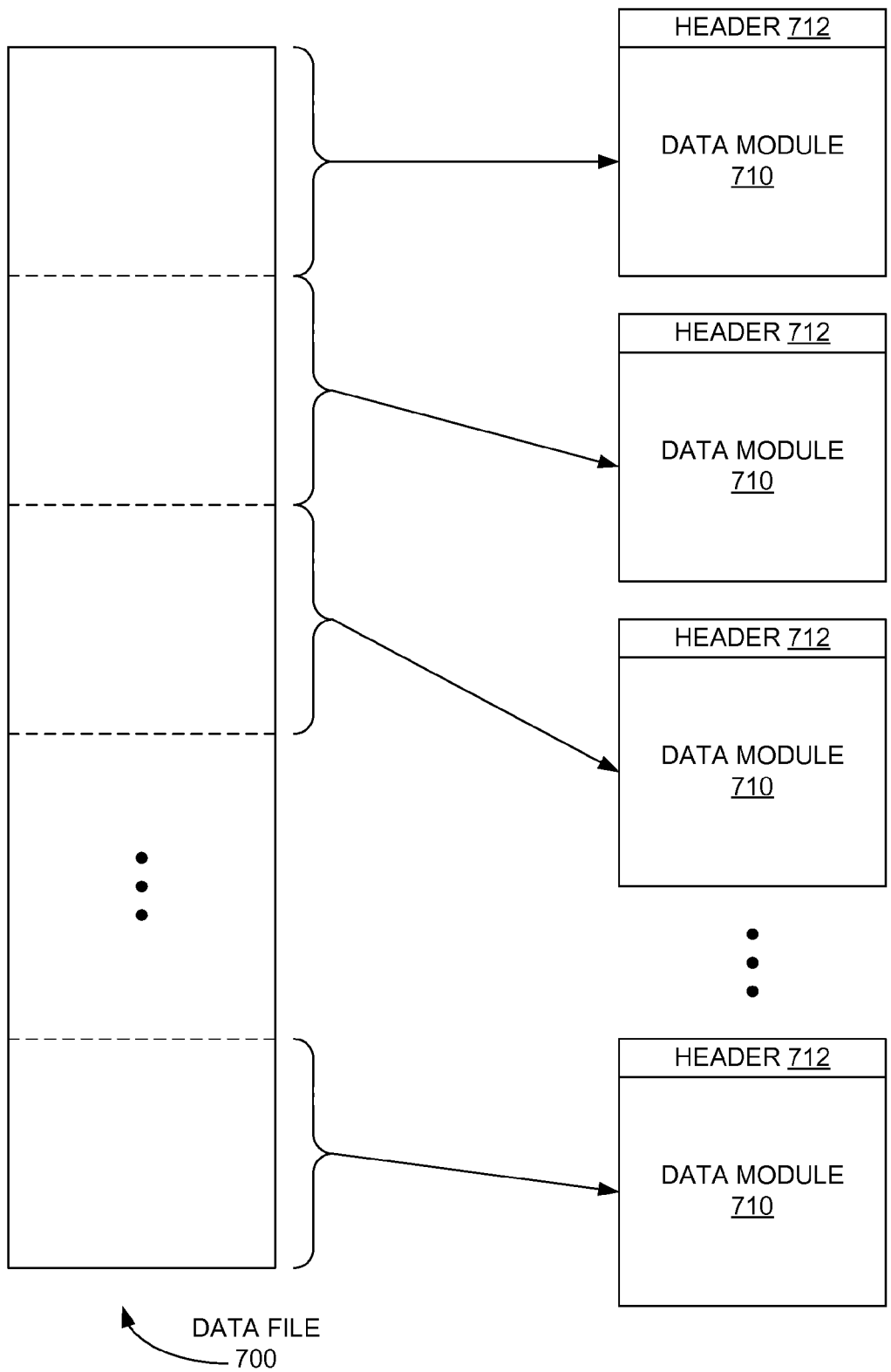
FIG. 7 is a block diagram of an example of a data file segmented into multiple data modules for multicast transmission.

FIG. 7 is a block diagram of an example data file 700 segmented into multiple data modules 710 for a multicast transmission 420. As shown in this example, the segmentation module 202 of the source device 102 may segment the data file 110 into contiguous segments of equal length, each of which is a data module 710 for which the header generation module 204 generates a separate header 712. In the specific example of FIG. 7, each header 712 is attached to the beginning of the data module, but other locations, such as appended to the end of the associated data module 710 or inserted within the data module 710, are also possible. In other implementations, each data module 710 may be of a standard size or length, with one data module 710 (e.g., the first data module 710 or the last data module 710) may be shorter or longer than the other data modules 710. In yet other embodiments, the length or size of each of the data modules 710 associated with the data file 110 may vary.

Figure 8A:
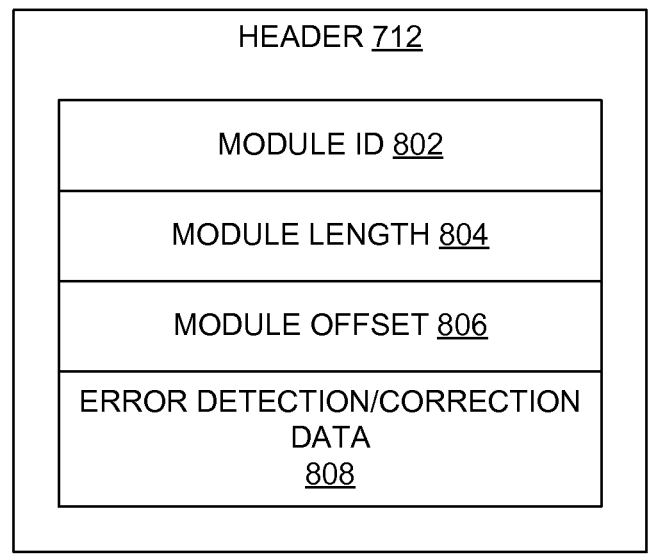
FIG. 8A is a block diagram of an example header for each of the data modules of FIG. 7.

FIG. 8A is a block diagram of an example header 712 for each of the data modules 710 of FIG. 7. In this example, the header 712 may include a module identifier 802, a module length 804, a module offset 806, and error detection/correction data 808. In other implementations of the header 710, one or more of these items of information may be omitted, and/or one or more additional items of information may be included. The module identifier 802 may be a unique identifier for the data module 710 corresponding to the header 712. More specifically, the module identifier 802 may be a number indicating a relative location of the associated data module 710 within the data file 110 compared to other data modules 710 of the data file 110.

The module length 804 may indicate the length of the associated data module 710 (e.g., in bits, in bytes, or in words) to indicate an amount of memory that may be required to stored the data module 710. Further, the module offset 806 may indicate the location of the start of the associated data module 710 within the data file 110, stated in some unit, such as bits, bytes, or words. In some examples, the header 712 may also include error detection/correction data 808 for the data module 710 and/or the header 712, as described above. The error detection/correction data 808 may include, for example, CRC and/or ECC data.

Figure 8B:
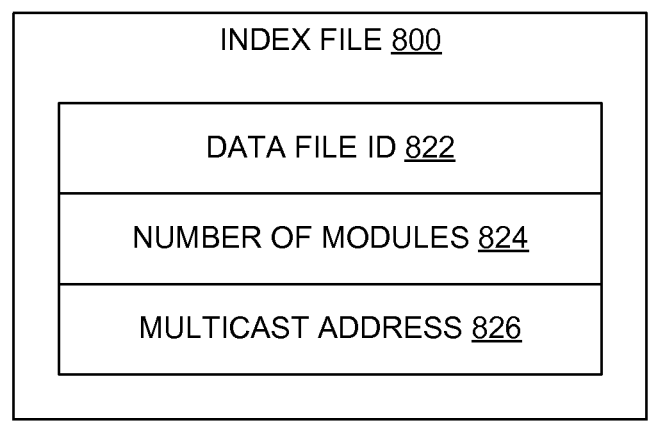
FIG. 8B is a block diagram of an example index file describing the data modules of FIG. 7.

FIG. 8B is a block diagram of an example index file 800 describing the data modules 710 of FIG. 7. In this example, the index file 800 includes a data file identifier 822, a number or value 824 indicating the number of data modules 710 derived from the data file 110, and a multicast address 826 associated with the multicast transmission 420 carrying the data modules 710. In one example, the data file identifier 822 may be a file name, file number, uniform resource location (URL), or other label that may uniquely identify the data file 110 among other data files 110 provided via the source device 102. In some implementations, the multicast address 826 may be an IGMP group address identifying the multicast transmission 420 for the data modules 710 of the data file 110. In another example, the index file 800 may include such information for multiple data files 110.

Figure 9:
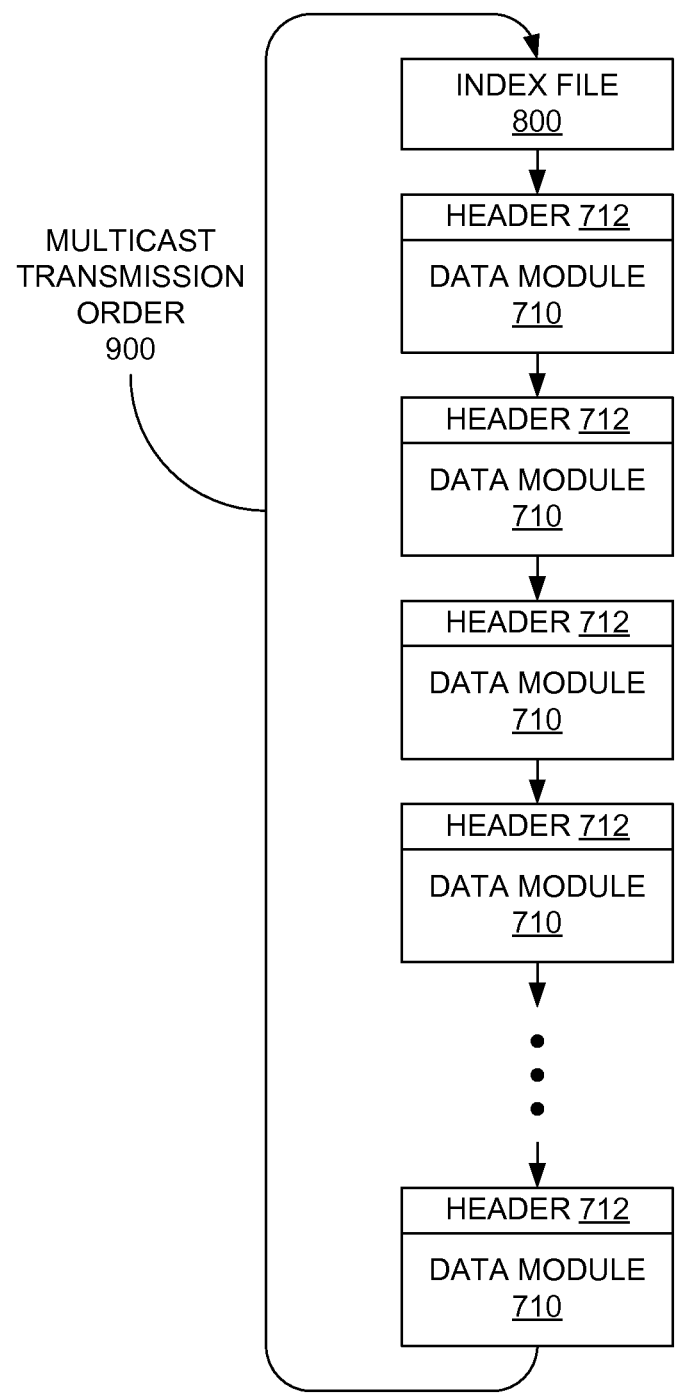
FIG. 9 is a graphical representation of an example multicast transmission order for multiple data modules.

FIG. 9 is a graphical representation of an example multicast transmission order 900 for multiple data modules 710. In this particular example, the index file 800 associated with a data file 110, along with each data module 710 and its associated header 712, are transmitted in a particular order 900, with that order 900 being repeated cyclically. In one example, the index file 800 is transmitted first, followed by each data module 710 in its original order reflected in the data file 110. However, any order of the index file 800 and the data modules 710 may be employed in other implementations, such as from smallest to largest in size, or vice versa. Further, in some implementations, the index file 800 need not be transmitted over the same multicast transmission, but may be delivered within its own multicast transmission, via a point-to-point connection, or by other means. Also, as shown in FIG. 9, each header 712 precedes its corresponding data module 710, although each header 712 may occupy other locations with respect to its data module 710 in other example multicast transmission orders 900, such as immediately after its related data module 710, or embedded within the data module 710.

Figure 10:
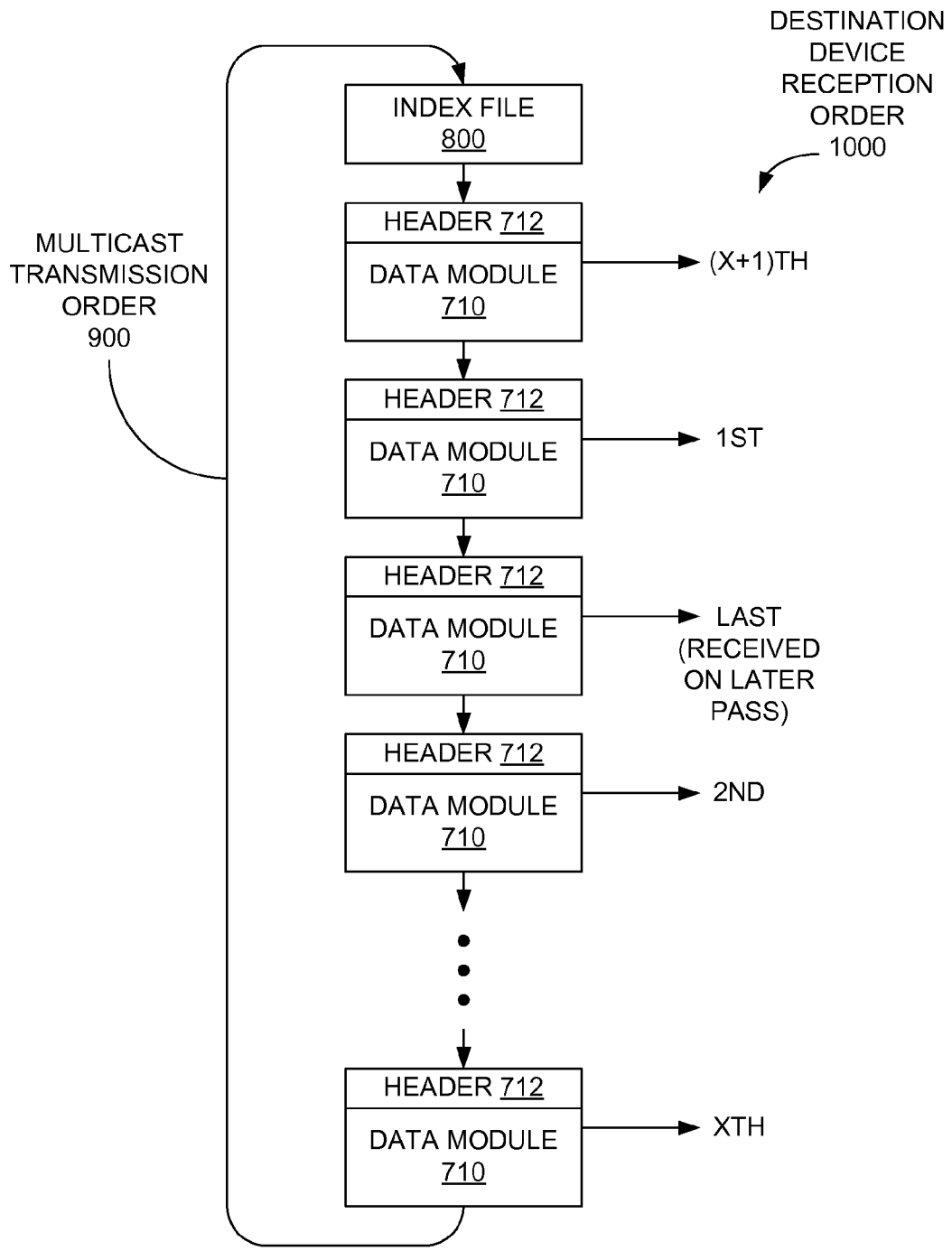
FIG. 10 is a graphical representation of an example reception order of multiple data modules transmitted via multicast.

FIG. 10 is a graphical representation of an example reception order 1000 of multiple data modules 710 transmitted via a multicast transmission 420. In this specific example, the multicast transmission order 900 depicted in FIG. 9 is presumed. In this particular example, a destination device 104 does not begin receiving the data modules 710 until the second data module 710 and associated header 712 for the data file 110. In other examples, the destination device 104 may begin receiving the data modules 710 at any of the data modules 710 in the multicast transmission 420.

Also in this example, after receiving the second data module 710 successfully, the destination device 104 unsuccessfully attempts the read the next data module 710. For example, the next data module 710 may exhibit an uncorrectable data error of some kind. As a result, the destination device 104 then proceeds to read the following data module 710 as the second data module 710 to be received. The destination device 104 may then continue reading the following data modules 710 in order through the end of the multicast transmission order as the xth data module 710 received, followed by the first data module 710 in the multicast transmission order 900 as the (x+1)th data module 710 to be received. The destination device 104 may then skip the next (second) data module 710, as it has already been received, and attempt to receive the data module 710 that was found to be uncorrectable during the previous pass. This time, that data module 710 may be read successfully, resulting in all of the data modules 710 and associated headers 712 for the data file 110 being read successfully, albeit in a different reception order 1000 from the original multicast transmission order 900.

In some implementations, the destination device 104, via the memory control module 308, may store each data module 710 in a predetermined area of memory based on the information provided in the index file 800 (e.g., the number of modules 824) and the respective header 712 (e.g., the module identifier 802, the module length 804, and/or the module offset 806). For example, the destination device 104 may reserve at least a number of memory areas equal to the number of modules 824, and then store each data module 710 in a particular memory area associated with its module identifier 802. The size of a memory area may be set or adjusted via the module length 804, and the particular location of a memory area may be set or adjusted in view of the module offset 806. Other methods of employing each of the values of the headers 712 and the index file 800 may be utilized in other embodiments.

Figure 11:
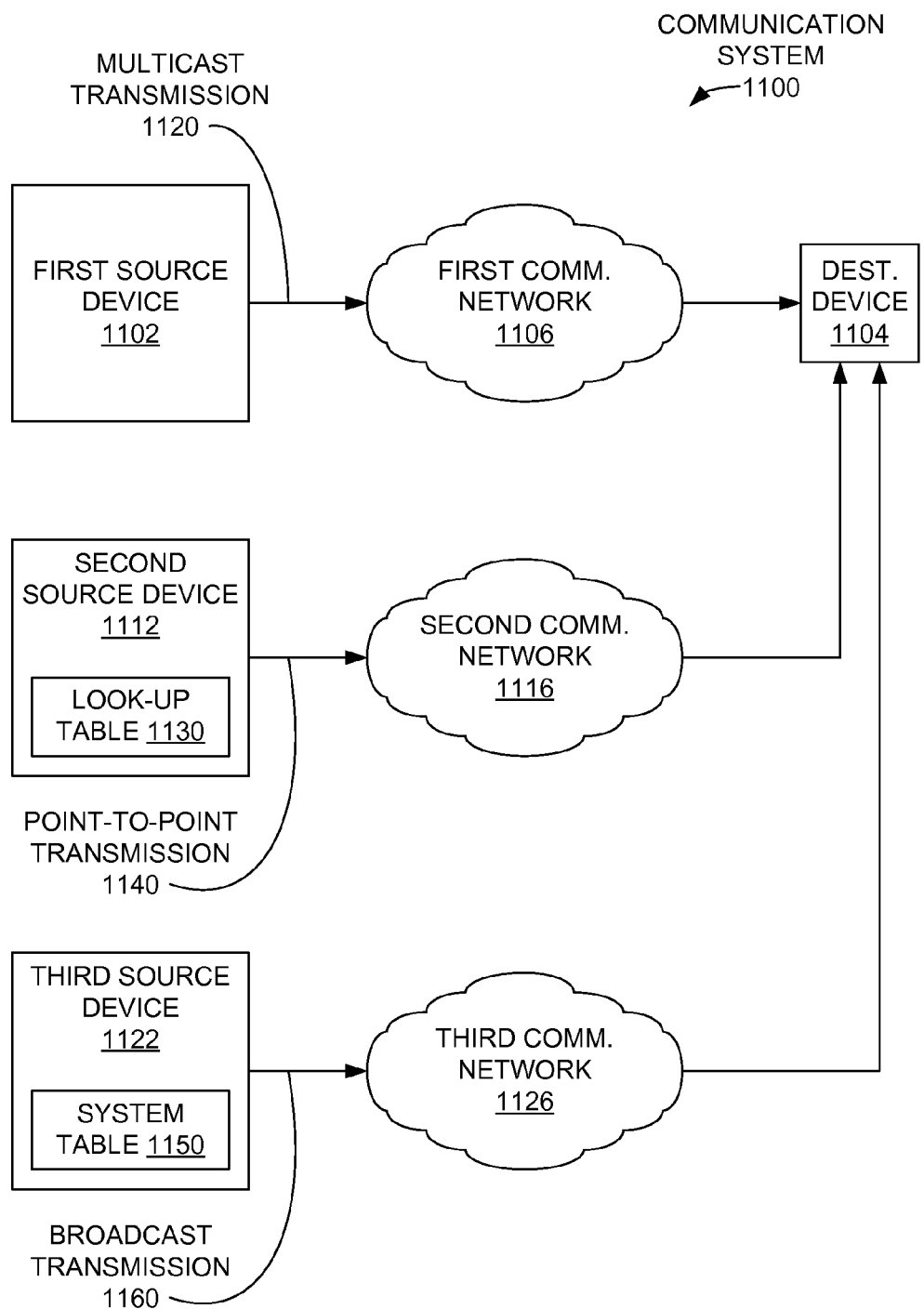
FIG. 11 is a block diagram of an example communication system in which a destination device may receive one or more data modules via a multicast transmission, a point-to-point transmission, or a broadcast transmission.

FIG. 11 is a block diagram of an example communication system 1100 in which a destination device 1104 may receive one or more data modules, as well as index information or an index file, via a multicast transmission 1120, a point-to-point transmission 1140 (e.g., a broadband network communication), or a broadcast transmission 1160 (e.g., a satellite, cable, or terrestrial broadcast transmission). More specifically, a first source device 1102 transmits the data modules of a data file via the multicast transmission 1120 by way of a first communication network 1106 to the destination device 1104, as well as possibly other destination devices, as described in detail above. In addition, a second source device 1112 may transmit at least one or more of the data modules using a point-to-point transmission 1140 over the second communication network 1116 to the destination device 1104. To accomplish this task, the second source device 1112 may store or have access to a look-up table 1130 that provides information indicating a network address (e.g., a URL) for each of the data modules, the address indicating the location from which a corresponding data module may be retrieved over the second communication network 1116.

Further, in some examples, the destination device 1104 may also retrieve one or more of the data modules, as well as index information or an index file, from a third source device 1122 via a broadcast transmission 1160 (e.g., a cable, satellite, or terrestrial broadcast transmission) over a third communication network 1126. As a result, the first source device 1102, the second source device 1112, and/or the third source device 122 may share access to the data modules and the associated index file, which may be stored within one of the source devices 1102, 1112, and 1122, or stored in another system that is accessible by the source devices 1102, 1112, and 1122. In one example, the third source device 1122 may include or maintain access to a system table 1150 that may provide look-up information for the data modules and/or an index file associated with the data modules.

Figure 12:
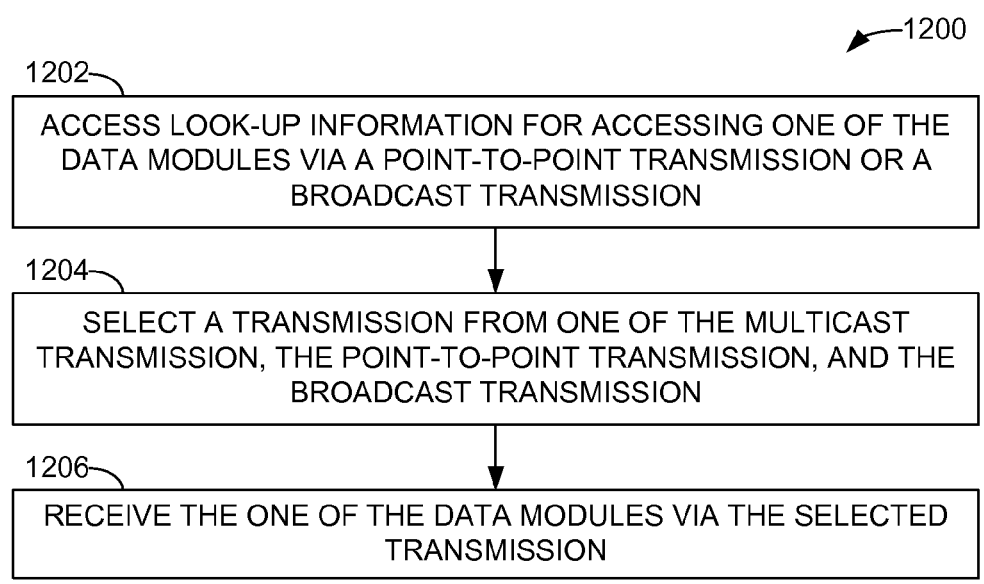
FIG. 12 is a flow diagram of an example method of receiving a data module via a multicast transmission, a point-to-point transmission, or a broadcast transmission.

FIG. 12 is a flow diagram of an example method 1200 of receiving a data module via a multicast transmission 1120, a point-to-point transmission 1140, or a broadcast transmission 1160, as illustrated in FIG. 11. In the method 1200, the destination device 1104 may access look-up information via the look-up table 1130 of the second source device 1112 or the system table 1150 of the third source device 1122 for accessing one or more of the data modules via the point-to-point transmission 1140 or the broadcast transmission 1160 (operation 1202). In some examples, the look-up table 1130 and/or the system table 1150 may provide network addresses, packet identifiers, or other information for retrieving or identifying one or more data modules from the point-to-point transmission 1140 and/or the broadcast transmission 1260. In one example, the destination device 1104 may download the entire look-up table 1130 or system table 1150 as a precautionary measure in case one or more of the data modules is not successfully retrieved via the multicast transmission 1120. In another implementation, the destination device 1104 may retrieve at least a portion (e.g., either a selectable or predetermined portion) of the look-up table 1130 or system table 1150 for look-up information regarding a particular data module that the destination device 1104 has attempted, but failed, to receive via the multicast transmission 1120. In one implementation, the destination device 1104 may collect the look-up information, such as what may be provided in an index file, from the broadcast transmission 1160 in order to retrieve one or more of the data modules from one or more of the multicast transmission 1120, the point-to-point transmission 1112, or the broadcast transmission 1160.

The destination device 1104 may then select a transmission from the multicast transmission 1120, the point-to-point transmission 1140, and/or the broadcast transmission 1160 over which to receive at least one of the data modules (operation 1204). In one example, the destination device 1104 may determine an expected time to receive a data module over the multicast transmission 1120 from the first source device 1102, an expected time to receive that data module over via a point-to-point transmission 1140 from the second source device 1112, and/or an expected time to receive the data module over via the broadcast transmission 1160 from the third source device 1122. More specifically, the destination device 1104 may presume an average time by which the data module may be received via the point-to-point transmission 1140, or may measure the response time of previous point-to-point transmissions 1140 to determine an average response time. The destination device 1104 may also estimate a time required to receive the data module via either the multicast transmission 1120 and/or the broadcast transmission 1160 given the time required to transmit a single data module over the multicast transmission 1120 and/or the broadcast transmission 1160, the identity of the current data module being transmitted over the multicast transmission 1120 and/or the broadcast transmission 1160, and the overall cycle time exhibited by the multicast transmission 1120 and/or the broadcast transmission 1160, and/or other parameters. In addition, the current bandwidth exhibited by any or all of the first communication network 1106, the second communication network 1116, and/or the third communication network 1126, the availability of one or more of the data modules via each of the communication networks 1106, 1116, and 1126, and/or other factors may also be considered in making a selection.

Based on the selection, the destination device 104 may then receive the data module in question over the selected transmission (operation 1206). For example, the destination device 1104 may determine that the data module was recently transmitted over the multicast transmission 1120 and/or the broadcast transmission 1160 and determine that receiving that same data module through the multicast transmission 1120 or the broadcast transmission 1160 will take longer than retrieving the same data module via the point-to-point transmission 1140. Oppositely, if the second communication network 1116 is relatively slow compared to the other communication networks 1106 and 1126, the destination device 1104 may choose between the other communication networks 1106 and 1126 for retrieving the data module. In other implementations, the destination device 1104 may determine that one or more data modules are not available via one or more of the communication networks 1106, 1116, and 1126, thus restricting the possible selection to those communication networks 1106, 1116, and 1126 that are able to provide the data module of interest. In yet other examples, if numerous or large numbers of data modules are to be retrieved, the destination device 1104 may receive the data modules from multiple communication networks 1106, 1116, and 1126 simultaneously or concurrently.

In some examples, two or more of the first source device 1102, the second source device 1112, and the third source device 1122 may be the same device or system, and/or two or more of the first communication network 1106, the second communication network 1116, and the third communication network 1126 may be the same communication network. In other examples, the first communication network 1106 and/or the third communication network 1126 may be a satellite communication network, and the second communication network 1116 may be a terrestrial communication network.

In another embodiment, a source device may be a residential gateway or similar device that provides the destination device 1104 with a communication connection to a broadband network. The gateway may receive one or more of the data modules via multicast or broadcast transmissions and store the received data modules locally (e.g., within the gateway or to a data storage device coupled with the gateway). As a result, the destination device 1104 may retrieve the data modules of interest from any or all of the residential gateway, a multicast transmission 1120, a point-to-point transmission 1140, and a broadcast transmission 1160. Further, any or all of the multicast transmission 1120, the point-to-point transmission 1140, and the broadcast transmission 1160 may be received directly from its associated source 1102, 1112, and 1122, respectively, and/or via the residential gateway.

In each of the embodiments discussed above, the source devices 102, 1102, 1112 may be servers, media content head-ends, or other devices or systems that are available to the public, or are available to a specific group of destination devices 104, 1114, as what may be available in a "walled garden" environment, subscription-based service, or the like.

Therefore, in at least some of the embodiments described above, each of many destination devices may receive a high-popularity or high-contention data file, such as a VOD catalog, EPG data file, or other data or executable file, without individual requests for point-to-point transmissions, resulting in less consumption of processing and memory resources at the source device providing the data file with no more than minimal impact in the amount of time required to receive the data file at the destination devices.

Figure 13:
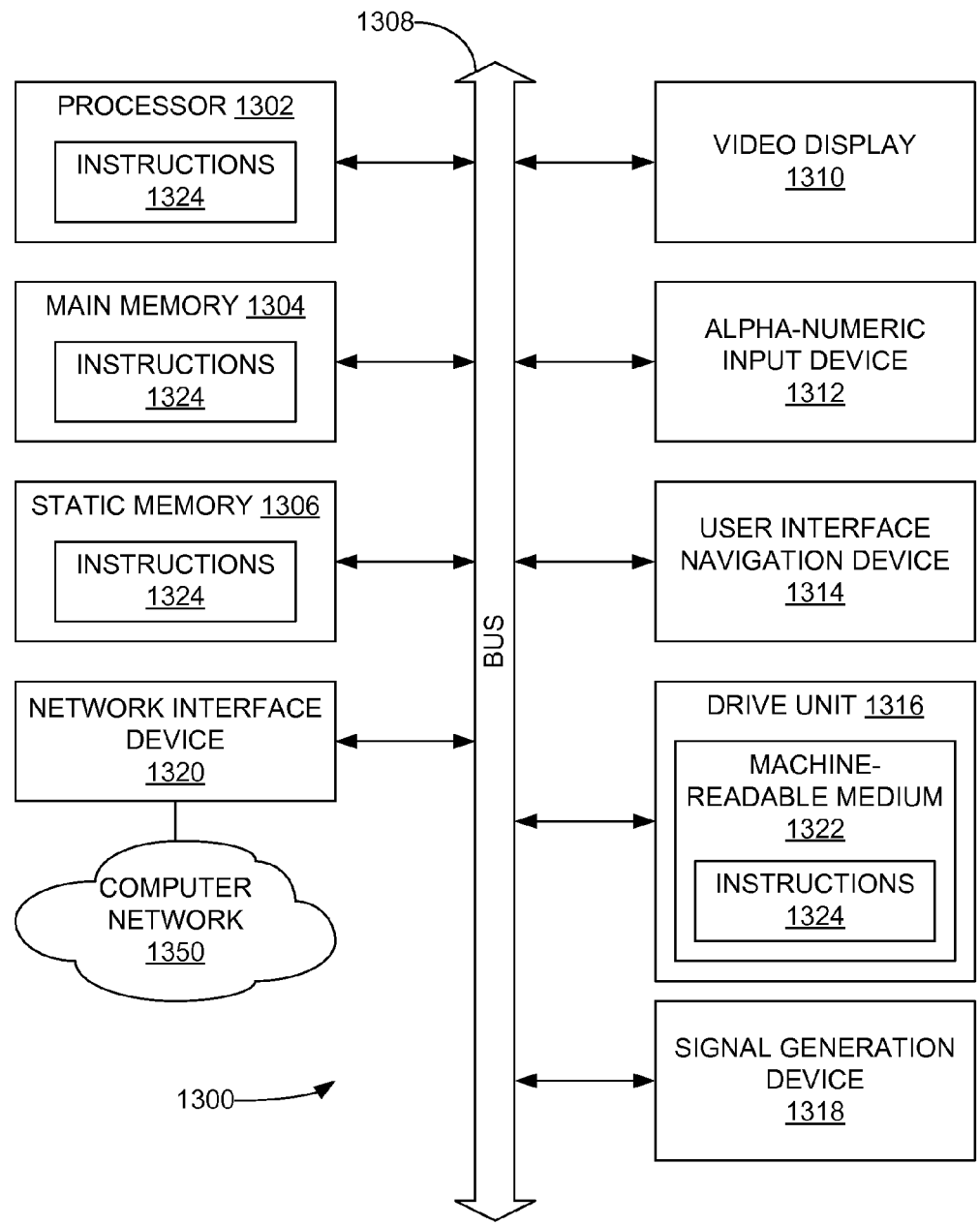
FIG. 13 illustrates a diagrammatic representation of a machine in the example form of a computer system within which a set of instructions, for causing the machine to perform any one or more of the methodologies discussed herein, may be executed.

FIG. 13 illustrates a diagrammatic representation of a machine in the example form of a computer system 1300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer, a tablet computer, an STB, a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306 which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

The disk drive unit 1316 includes a machine-readable medium 1322 on which is stored one or more sets of instructions and data structures (e.g., software 1324) embodying or utilized by any one or more of the methodologies or functions described herein. The software 1324 may also reside, completely or at least partially, within the main memory 1304 and/or within the processor 1302 during execution thereof by the computer system 1300, the main memory 1304 and the processor 1302 also constituting machine-readable media.

The software 1324 may further be transmitted or received over a network 1350 via the network interface device 1320 utilizing any one of a number of well-known transfer protocols (e.g., HyperText Transfer Protocol (HTTP)).

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, and optical and magnetic media.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms.

Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The Abstract of the Disclosure is provided to comply with 37 C.F.R. §1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of transmitting data, the method comprising:
segmenting a data file into a plurality of data modules;
generating, using at least one processor of a machine, a header for each of the data modules, the header comprising a module identifier and an offset value for the data module associated with the header, the module identifier indicating a relative location of the corresponding data module within the data file compared to the other data modules of the plurality of data modules, the offset value being different from the module identifier and indicating a starting location of the corresponding data module within the data file stated in a unit of digital information;
generating and transmitting, to a destination device, an indication of a number of the plurality of data modules associated with the data file, and at least one multicast address from which the plurality of modules may be received via a multicast transmission;
transmitting the plurality of data modules with their associated headers over a first communication network in the multicast transmission;
transmitting, to the destination device, look-up information for accessing at least one of the data modules via a second communication network distinct from the first communication network and look-up information for accessing the at least one of the data modules via a third communication network distinct from the first communication network and the second communication network;
transmitting, to the destination device, the at least one of the data modules via at least one of the second communication network and the third communication network;
selecting, by the destination device, a transmission from one of a second transmission over the second communication network and a third transmission over the third communication network based on a comparison of an expected time to receive the one of the data modules via the second communication network with an expected time to receive the one of the data modules via the third communication network; and
receiving, by the destination device, the one of the data modules using the selected transmission.

2. The method of claim 1, wherein the transmitting of the plurality of data modules with their associated headers comprises cyclically transmitting the plurality of data modules with their associated headers.

3. The method of claim 1, further comprising:
receiving an indication of at least one receiving device joining the multicast transmission, the transmitting of the plurality of data modules being initiated in response to the indication.

4. The method of claim 1, the transmitting of the indication of the number of the plurality of data modules and the at least one multicast address comprising transmitting the indication of the number of the plurality of data modules and the at least one multicast address in an index file.

5. The method of claim 1, the header further comprising redundancy data for at least one of detecting errors or correcting errors in the data module associated with the header.

6. The method of claim 1, the header further comprising a length of the data module associated with the header.

7. The method of claim 1, the multicast transmission employing an interact group management protocol.

8. The method of claim 1, further comprising formatting the plurality of data modules according to a user datagram protocol prior to the transmitting of the plurality of data modules.

9. The method of claim 1, further comprising formatting the plurality of data modules according to a real-time transport protocol over a user datagram protocol prior to the transmitting of the plurality of data modules.

10. The method of claim 1, wherein:
the look-up information for accessing the at least one of the data modules via the second communication network comprises look-up information for accessing the at least one of the data modules via a point-to-point transmission; and the look-up information for accessing the at least one of the data modules via the third communication network comprising look-up information for accessing the at least one of the data modules via a broadcast transmission, the broadcast transmission being distinct from the multicast transmission.

11. The method of claim 10, the first communication network comprising a satellite communication network, and the second communication network comprising a terrestrial communication network.

12. The method of claim 1, the data file comprising a video program catalog.

13. The method of claim 1, further comprising at least one of encrypting the plurality of data modules prior to the transmitting of the plurality of data modules, and encrypting the headers prior to the transmitting of the plurality of data modules.

14. The method of claim 1, further comprising:
determining a popularity of at least one of the data modules relative to others of the data modules;
wherein the transmitting of the plurality of data modules comprises modifying a cycle time of the transmitting of each of the at least one of the data modules via the multicast transmission based on the determined popularity of the at least one of the data modules.

15. The method of claim 14, further comprising:
determining a number of a plurality of destination devices attempting to receive each of the at least one of the data modules;
wherein the determining of the popularity of the at least one of the data modules is based on the determining of the number of the plurality of destination device attempting to receive each of the at least one of the data modules.

16. The method of claim 14, wherein the modifying of the cycle time of the transmitting of each of the at least one of the data modules comprises reducing the cycle time of the transmitting of one of the data modules in response to an increased popularity of the one of the data modules.

17. A data transmission system comprising:
a communication network interface;
at least one processor; and
memory comprising instructions that, when executed by the at least one processor, cause the processor to perform operations comprising:
segmenting a data file into a plurality of data modules;
generating a header for each of the data modules, the header comprising a module identifier and an offset value for the data module associated with the header, the module identifier indicating a relative location of the corresponding data module within the data file compared to the other data modules of the plurality of data modules, the offset value being different from the module identifier and indicating a starting location of the corresponding data module within the data file stated in a unit of digital information;
generating and transmitting, to a destination device, an indication of a number of the plurality of data modules associated with the data file, and at least one multicast address from which the plurality of modules may be received via a multicast transmission;
transmitting the plurality of data modules with their associated headers over a first communication network via the communication network interface in the multicast transmission;
transmitting, to the destination device, look-up information for accessing at least one of the data modules via a second communication network distinct from the first communication network and look-up information for accessing the at least one of the data modules via a third communication network distinct from the first communication network and the second communication network;
transmitting, to the destination device, the at least one of the data modules via at least one of the second communication network and the third communication network;
selecting, by the destination device, a transmission from one of a second transmission over the second communication network and a third transmission over the third communication network based on a comparison of an expected time to receive the one of the data modules via the second communication network with an expected time to receive the one of the data modules via the third communication network; and
receiving, by the destination device, the one of the data modules using the selected transmission.

18. A method of receiving data, the method comprising:
receiving, by a destination device, an indication of a number of a plurality of data modules associated with a data file, and at least one multicast address from which the plurality of modules are being transmitted in a multicast transmission over a first communication network;
joining, by the destination device, the multicast transmission comprising the plurality of data modules using the at least one multicast address;
receiving, by the destination device, at least some of the plurality of data modules from the multicast transmission, each of the plurality of data modules including a header comprising a module identifier and an offset value for the data module associated with the header, the module identifier indicating a relative location of the corresponding data module within the data file compared to the other data modules of the plurality of data modules, the offset value being different from the module identifier and indicating a starting location of the corresponding data module within the data file stated in a unit of digital information;
storing, using at least one processor of a machine, the received data modules in corresponding areas of memory based on the number of the plurality of data modules, the module identifier of each of the received data modules, and the offset value of each of the received data modules;
receiving, by the destination device, look-up information for accessing one of the data modules via a second communication network and look-up information for accessing the one of the data modules via a third communication network, the second communication network being distinct from the first communication network, and the third communication network being distinct from the first communication network and the second communication network;
selecting, by the destination device, a transmission from one of a second transmission over the second communication network and a third transmission over the third communication network based on a comparison of an expected time to receive the one of the data modules via the second communication network with an expected time to receive the one of the data modules via the third communication network; and receiving, by the destination device, the one of the data modules using the selected transmission.

19. The method of claim 18, the header comprising redundancy data for at least one of detecting errors or correcting errors in the data module associated with the header, the method further comprising:

detecting an error in one of the received data modules based on the redundancy data associated with the one of the received data modules, and correcting the error in the one of the received data modules using the redundancy data associated with the one of the received data modules.

20. The method of claim 17, the header comprising redundancy data for at least one of detecting errors or correcting errors in the data module associated with the header, the method further comprising:

detecting an error in one of the received data modules based on the redundancy data associated with the one of the received data modules;

determining that the error cannot be corrected using the redundancy data associated with the one of the received data modules; and receiving another copy of the one of the received data modules from the multicast transmission.

21. The method of claim 18, wherein the look-up information for accessing the one of the data modules via the second communication network comprises look-up information for accessing the one of the data modules via a point-to-point transmission over the second communication network, and the look-up information for accessing the one of the data modules via the third communication network comprises look-up information for accessing the one of the data modules via a broadcast transmission over the third communication network.

22. The method of claim 18, the plurality of data modules being transmitted cyclically in the multicast transmission.

23. The method of claim 18, further comprising:

determining, based on the second communication network being a point-to-point communication network, the expected time to receive the one of the data modules via the second communication network based on a measured response time of previous transmissions received over the second communication network.

24. The method of claim 18, further comprising:

determining, based on the second communication network being a broadcast communication network, the expected time to receive the one of the data modules via the second communication network based on an overall cycle time of the transmitting of the plurality of data modules over the second communication network.

25. A data reception system comprising:

a communication network interface;

at least one processor; and memory comprising instructions that, when executed by the at least one processor, cause the processor to perform operations comprising:

receiving, by a destination device, an indication of a number of a plurality of data modules associated with a data file, and at least one multicast address from which the plurality of modules are being transmitted in a multicast transmission over a first communication network;

joining, by the destination device, the multicast transmission comprising the plurality of data modules using the at least one multicast address;

receiving, by the destination device, at least some of the plurality of data modules from the multicast transmission via the communication network interface, each of the plurality of data modules including a header comprising a module identifier and an offset value for the data module associated with the header, the module identifier indicating a relative location of the corresponding data module within the data file compared to the other data modules of the plurality of data modules, the offset value being different from the module identifier and indicating a starting location of the corresponding data module within the data file stated in a unit of digital information;

storing the received data modules in corresponding areas of memory based on the number of the plurality of data modules, the module identifier of each of the received data modules, and the offset value for each of the received data modules;

receiving, by the destination device, look-up information for accessing one of the data modules via a second communication network and look-up information for accessing the one of the data modules via a third communication network, the second communication network being distinct from the first communication network, and the third communication network being distinct from the first communication network and the second communication network;

selecting, by the destination device, a transmission from one of a second transmission over the second communication network and a third transmission over the third communication network based on a comparison of an expected time to receive the one of the data modules via the second communication network with an expected time to receive the one of the data modules via the third communication network; and receiving, by the destination device, the one of the data modules using the selected transmission.

* * * * *

UNITED STATES PATENT AND TRADEMARK OFFICE
CERTIFICATE OF CORRECTION

PATENT NO. : 9,848,029 B2  
APPLICATION NO. : 13/730117  
DATED : December 19, 2017  
INVENTOR(S) : Vezzuto et al.

Page 1 of 1

It is certified that error appears in the above-identified patent and that said Letters Patent is hereby corrected as shown below:

In the Claims

In Column 16, Line 56, in Claim 7, delete "interact" and insert --internet-- therefor In Column 19, Line 13, in Claim 19, delete "modules," and insert --modules;-- therefor In Column 19, Line 17, in Claim 20, delete "claim 17," and insert --claim 18,-- therefor Signed and Sealed this  
Eighth Day of December, 2020

Andrei Iancu  
*Director of the United States Patent and Trademark Office*